April 27, 1954 R. L. GRIFFIN 2,676,412
THICKNESS MEASURING APPARATUS FOR SHEET MATERIAL
Filed Dec. 5, 1950 5 Sheets-Sheet 1

Fig.1

Inventor
Roger L. Griffin
by Roberts, Cushman & Grover
att'ys.

April 27, 1954 R. L. GRIFFIN 2,676,412
THICKNESS MEASURING APPARATUS FOR SHEET MATERIAL
Filed Dec. 5, 1950 5 Sheets-Sheet 2

Inventor
Roger L. Griffin
by Roberts, Cushman & Grover
Att'ys.

April 27, 1954        R. L. GRIFFIN        2,676,412
THICKNESS MEASURING APPARATUS FOR SHEET MATERIAL
Filed Dec. 5, 1950        5 Sheets-Sheet 3

Inventor
Roger L. Griffin
by Roberts, Cushman & Grover
att'ys.

Inventor
Roger L. Griffin
by Roberts, Cushman & Grover
Att'ys.

Fig. 8

Patented Apr. 27, 1954

2,676,412

UNITED STATES PATENT OFFICE 2,676,412

THICKNESS MEASURING APPARATUS FOR SHEET MATERIAL

Roger L. Griffin, Marblehead, Mass., assignor, by mesne assignments, to Swift & Company, Chicago, Ill., a corporation of Illinois Application December 5, 1950, Serial No. 199,256

10 Claims. (Cl. 33—148)

This invention relates to measuring apparatus and more particularly to apparatus for determining the thickness of sheet material such as leather.

In the processing of leather it is necessary to measure the maximum thickness of selected portions of the skins in order to determine the setting of the shaving machine for removing excess stock. The practice has been generally to determine this thickness manually by folding the skin double and making several measurements by means of a micrometer. Although these measurements are made by a skilled operator and carefully checked, their accuracy is always subject to doubt because of the judgment required in selecting the points at which the measurements are made.

It is accordingly the principal object of this invention to provide apparatus for automatically and accurately determining the thickness of sheet material. Further objects are to provide thickness measuring apparatus which gives an indication of only the maximum determined thickness in a selected area, which gives indications in steps preselected in units of a standard thickness gauge, which determines if the thickness is greater or lesser than preselected limits, which is rapid in operation, which can be adapted to be used in conjunction with a standard area measuring machine, which does not require a skilled operator, and which advances the art generally.

In a broad aspect the invention contemplates apparatus for determining the thickness of a sheet material comprising measuring means such as a roll pivotally mounted to contact the outer surface of a material as such material moves along a path, for example, upon a conveyor or conveying means so that the angular movement of the roll about a pivot is the measure of the distance between the selected point in the path determined, for example, by the position of one or more rolls which cooperate with the measuring roll and the outer surface of the material thereby determining its thickness. Indicating means are provided which operate in response to the amount of angular movement of the roll to indicate the distance determined by the roll and therefor the thickness of the sheet. Preferably the latter means include an electric circuit for operating a plurality of signalling devices which correspond, respectively, to successive thickness measurements and are energized in response to the amount of angular movement of the roll.

In another broad aspect the indicating means include timing means such as an electronic time delay relay for interrupting the operation thereof after a predetermined time interval to limit the distance or lengthwise dimension of the sheet which is subject to the thickness determination. When the thickness of successive pieces of sheet material such as skins is to be determined, means such as a photoelectric cell are used to initiate the operation of the indicating means in response to the presence of a skin upon the conveying means. The photoelectric cell or other determining means is positioned from the measuring roll a distance measured in the direction of movement of the conveying means equal to the preselected distance from the edge of each piece at which the thickness determination is to be started. It will be evident that the relative locations of the measuring roll and the photoelectric cell determines the position with respect to the leading edge of the skin, and that the length of the cycle of the time delay relay determines the length of the area measured. It will be evident that it is also possible to vary the position at which the measurement starts by the incorporation of an adjustable time delay relay in the output circuit of the photoelectric circuit so that the effective signal therefrom can be delayed until the skin reaches the selected position. The width of the area measured is determined by the axial length of the measuring roll.

In another aspect the indicating means is an electrical circuit including a plurality of switches, each of which is operated by the measuring means to energize a respective signalling device which is preferably although not necessarily a visual signal such as a lamp which indicates the maximum distance or thickness determined by the measuring means. When the measuring means is a pivotally mounted roll, the switches are successively operated as the distance between the path traversed by the material and the roll increases as the roll is lifted due to increased thickness of the sheet material being measured.

In a more specific aspect each switch operates a respective relay, one pair of whose contacts energizes a respective signalling device. The remaining relay contacts of each relay are interconnected with the contacts of the other relays so that only the signalling device corresponding to a maximum thickness measure is energized. Such interconnection is preferably made by providing each relay with two normally closed contacts and two normally open contacts. The relay solenoids are energized by the operation of the correlated roll operated switches to transfer the associated relay contacts, the energizing circuit for each solenoid also including in series connection with the correlated switch, one pair of the normally closed contacts of each of the relays being energized by switches subsequently closed by the pivotal movement of the roll as the thickness of the material increases. One pair of normally open contacts of each relay is closed, respectively, when the corresponding relay solenoid is energized by the correlated roll switch to complete a holding circuit paralleling the roll switch, which circuit also includes the second pair of normally closed contacts of each relay energized by subsequently closed roll switches whereby only the relay solenoid associated with the roll switch closed by the maximum angular movement of the roll during a given measurement remains energized. The second pair of normally open contacts of each relay energizes a respective signalling device so that only the device corresponding to the maximum thickness determined by the measuring gives an indication.

Further objects and aspects relate to various features of construction and will be apparent from a consideration of the following description and accompanying drawings wherein.

Figure 1:
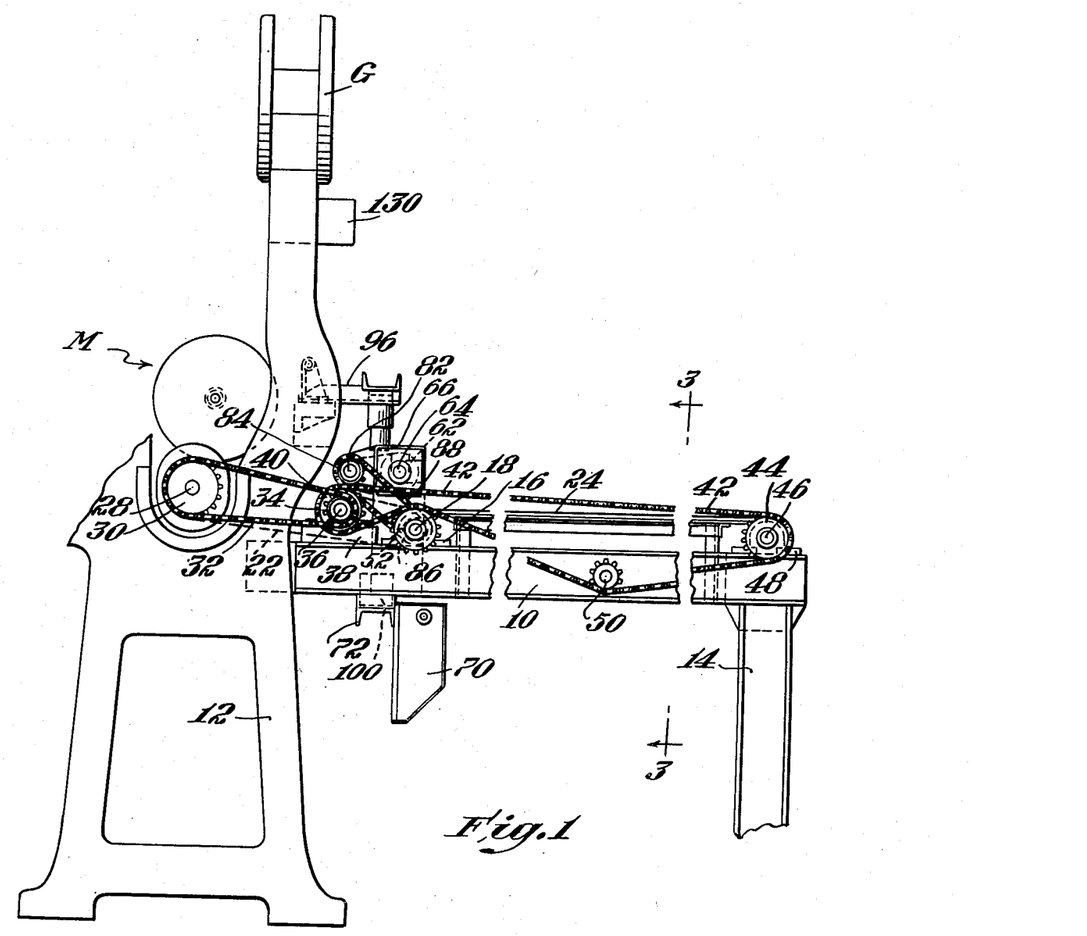
Fig. 1 is a side elevation view showing the thickness measuring apparatus attached to the rear of the frame of a conventional area measuring machine.
Figure 2:
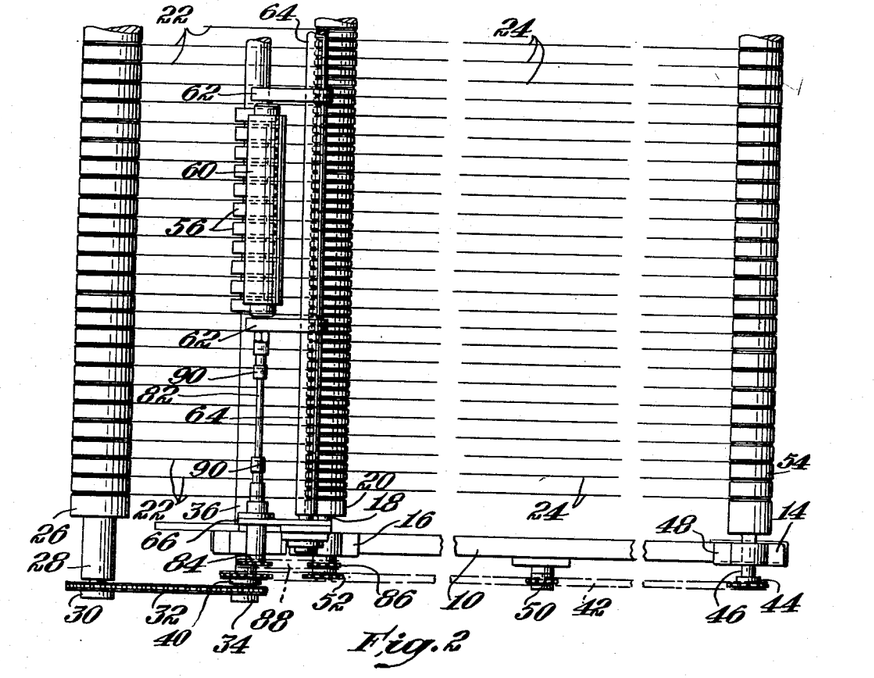
Fig. 2 is a partial plan view of the apparatus shown in Fig. 1.

As is best illustrated in Fig. 1, the measuring apparatus is supported upon a frame comprising two spaced, essentially horizontal channel members 10, one end of each of which is bolted or otherwise secured to the rear portion of the legs of the frame 12 of a conventional area measuring device M. The other end of each channel member 10 is supported by means of a respective leg 14 which is also channel-shaped in cross-section. At an intermediate point on each of the horizontal channel members 10 is supported a bearing block 16 which is aligned with the bearing block upon the opposite channel member so that a shaft 18 carrying a conveyor roll 20 (Figs. 2 and 3) can be journaled therein. The periphery of the conveyor roll 20 is provided with a plurality of spaced, circumferential grooves wherein are carried a plurality of conveyor wires or belts 22 and 24 which are arranged in alternate grooves, respectively. The belts 22 also pass around the bed roll 26 (Fig. 2) of the area measuring machine M to form conveying means for receiving the skins as they emerge from the area measuring machine which operates in a well known manner and forms no part of the present invention other than that which has been discussed heretofore so that it need not be described further.

Power for operating the conveying means is taken from the bed roll 26. To this end the shaft 28 (Fig. 1) carrying the bed roll is provided with a sprocket gear 30 whose teeth engage a chain 32 which drives a sprocket gear 34 carried upon the end of a shaft 36 journaled in bearing blocks 38 secured to the top of the frame members 10. The shaft 36 also carries a second sprocket gear 40 for a chain 42 which passes over a sprocket gear 44 on a shaft 46 which is journaled in bearing blocks 48 carried near the end of the frame members 10. The chain 42 passes under an idler gear 50 and over the top of a gear 52 secured to the end of the shaft 18 which carries the conveyor roll 20.

The shaft 46 carries a conveyor roll 54 (Fig. 2) having a plurality of circumferential grooves which engage the belts 24 thereby to form a second conveying means for removing the skins from the measuring apparatus, as will be described hereinafter. From the above it will be evident that rotation of the bed roll 26 drives the shaft 36 by means of chain 32, which shaft in turn, through the chain 42, drives the shafts 18 and 46 carrying the conveyor rolls 20 and 54, respectively. By proper selection of the number of teeth on the various sprocket gears, the peripheral speed of the rolls can be made the same so that there is substantially no slippage of the belts.

The means for measuring the thickness of sheet material carried by the belts 22 comprises a plurality of backing rollers 56 which are carried on the shaft 36 and driven thereby. Cooperating with the rollers 56 is a measuring roll 60 whose ends are respectively journaled in the ends of two arms 62 which extend from a shaft 64. The ends of the shaft 64 are journaled, respectively, in upright members 66 (Fig. 1) extending from the top of the frame members 10 so that the measuring roll 60 is pivotally mounted with respect to the rollers 56.

From the above it will be apparent that the rollers 56 determine a definite reference point in the path of sheet material carried by the conveyor belts 22, and that, as the measuring roll 60 rides upon the top of the material, the amount of its angular movement about the shaft 64 is a function of the thickness of the material. This angular movement is measured by successively closing control switches S2—S8 (Fig. 8) (whose function will be described hereinafter) located in a control box 70 carried below a cross member 72 (Fig. 3) extending between the frame members 10. The mechanical linkage arrangement for closing the control switches in response to the rotation of the pivotal shaft 64 comprises, as is shown in Fig. 4, two arms 74 and 76 which are attached, respectively, to the shaft 64 and a switch operating shaft 78. The ends of the arms 74 and 76 are attached by pivotal connections to the respective ends of a rod 80, the arms being oriented so that, as the shaft 64 rotates in a counterclockwise direction as viewed in Fig. 4 in response to an increase in thickness of material, the switch operating shaft is rotated clockwise successively to close the control switches, as will be described in detail hereinafter.

It has also been found advantageous to drive the measuring roll 60. This is accomplished by attaching one end of an extension shaft 82 (Fig. 3) to the measuring roll 60. The other end of the shaft 82, carrying a sprocket gear 84, is journaled in one of the upright members 64. The gear 84 is driven from a sprocket gear 86 carried upon the conveyor roll shaft 18 by means of a chain 88. To accommodate the pivotal movement of the measuring roll 60, two flexible couplings 90 are provided in the shaft 82.

Figure 3:
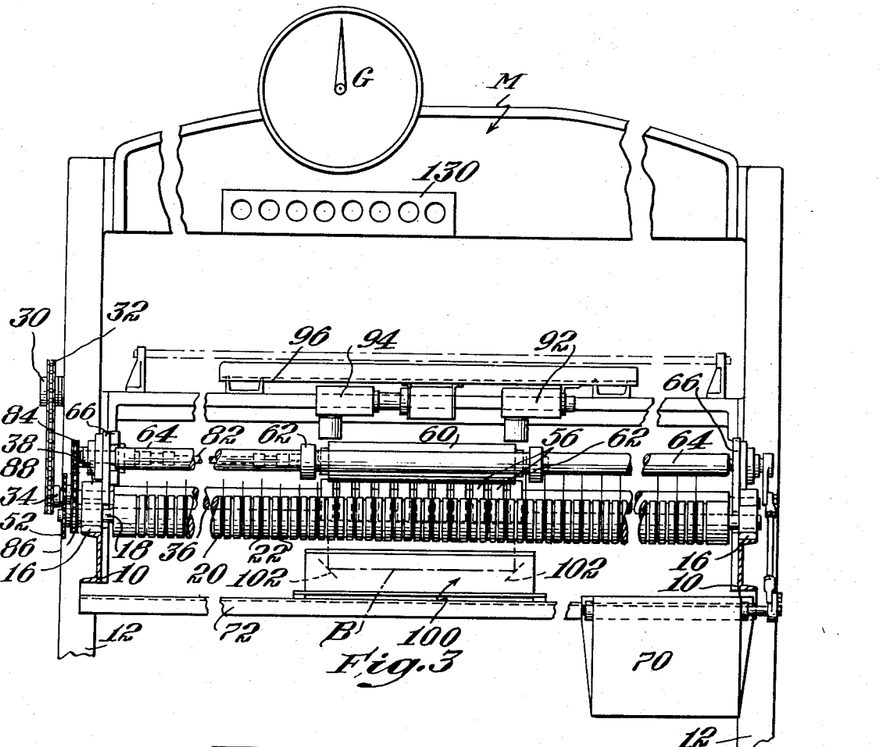
Fig. 3 is a sectional view taken on line 3—3 of Fig. 1.
Figure 4:
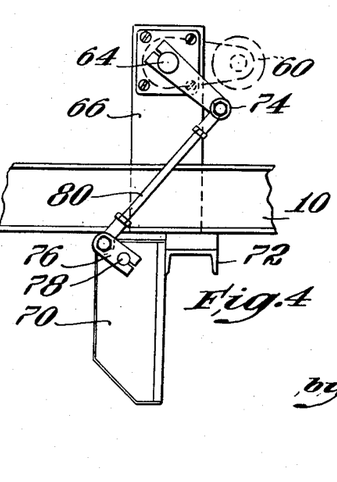
Fig. 4 is a fragmentary side elevation view showing the bell crank connecting the pivotal shaft of the measuring roll with the control box.

As is shown in Figs. 1 and 3, a light source 92 and photoelectric cell 94, controlling the contacts *sp* (Fig. 8) of a relay, are suspended from the frame of the area measuring machine M by means of a bracket 96. Located below the conveyor belts upon the cross member 72 on the frame members 10 is a mirror box 100 having two mirrors 102 disposed so that a beam B of light from the light source 92 travels downwardly through the conveyor belts 22 to contact the first mirror and thence to the second mirror which directs the beam back upwardly to impinge upon the photoelectric cell 94. The interruption of the light beam B by the presence of a skin on the conveyor belts 22 starts the thickness measuring operation, as will be described in detail hereinafter. The beam arrangement shown is particularly useful when measuring material having an irregular outline, such as skins wherein a scalloped or recessed leading edge might fail to interrupt a photoelectric arrangement having only a single beam in time to start the thickness measurement at the desired position.

Figures 5, 6:
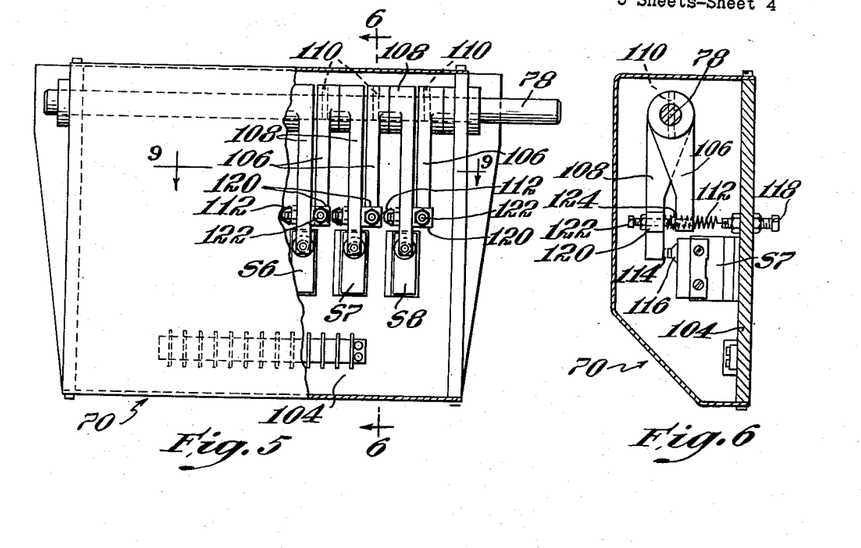
Fig. 5 is a side elevation view of the control box with the front wall partially broken away.
Fig. 6 is a section on lines 6—6 of Fig. 5.

The arrangement for operating the control switches S2—S8 is shown in Figs. 5 and 6 wherein a plurality of snap action switches of the "micro switch" type are mounted in a row upon the rear wall 104 of the switch box 70 which is suspended from beneath the cross member 72, as mentioned above. The switches S2—S8 are successively operated by the rotation of the shaft 78 by means of the lever arrangement described heretofore so that, as the measuring roll 60 moves further from the rollers 56 with increasing thickness of the sheet material being measured, the switches are successively tripped.

Figure 9:
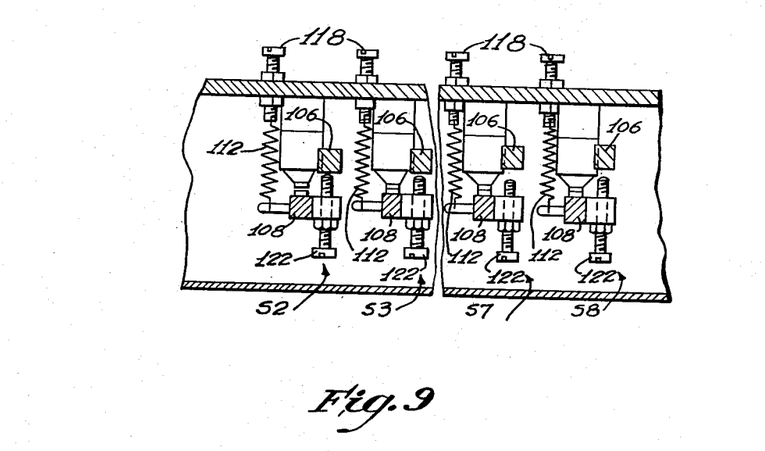
Fig. 9 is a section on line 9—9 of Fig. 5.

The means for tripping each of the individual control switches S2—S8 is comprised of a lift arm 106 and a switch contact arm 108, both of which are carried upon the shaft 78 operated by the push rod 80. The lift arms 106 are secured to the shaft 78 by means of pins 110 so that they turn with the shaft. The contact arms 108 are freely rotatable upon the shaft 78 and are biased by means of a spring 112 so that a respective contact button 114, carried on the end of each thereof, is brought into contact with the actuator 116 of the correlated switch. The tension in the spring 112 is regulated by means of a respective adjusting screw 118 which is threaded through the rear wall 104 of the control box 70 to secure one end of the spring. The other end of each spring 112 is connected with the one end of a pin 120 which extends transversely through the correlated contact arm 108. The other end of each pin 120, which extends through to the opposite side of the correlated arm 108, is rectangular in shape and has a threaded aperture therein for receiving an adjustment screw 122 which engages a contact button 124 in the end of the associated lift arm 106. The lift arms 106 are displaced angularly about the shaft 78 (Fig. 9) so that, as the shaft 78 is rotated in a clockwise direction (as viewed in Fig. 4) as the measuring roll 60 is raised, the contact buttons 124 of the lift arms 106 successively contact the ends of the respective adjustment screws 122 of contact arms 108, thereby successively rotating the contact arms against the forces exerted by the springs 112. The screws 122 are adjusted so that the contacts of the switches S2—S8 are successively closed by the release of their actuators 116 at intervals equivalent to a series of preselected thickness steps as measured by the movement of the measuring roll 60. Thus in Fig. 9 switch S2 has already closed, arm 106 of switch S3 has contacted the adjustment screw on arm 108 preparatory to closing switch S3 upon further increase of thickness, and the arms 106 of succeeding switches are spaced farther and farther from their adjusting screws so as to close the switches successively in response to continued increase in thickness. When the apparatus is used to determine the thickness of skins, it is preferable that it be calibrated to duplicate the results obtained. When a micrometer is used to measure the thickness of a skin folded double, the units of measurement are 64ths of an inch or "ounces." Graded in this manner the skins are classified in eight steps as "under 7 ounces," 7–8 ounces, 8–9 ounces, 9–11 ounces, 11–13 ounces, 13–15 ounces, 15–18 ounces, and "18 ounces up." As the skin is not doubled when upon the conveyor belts 22, the corresponding screw 122 is adjusted so that the contacts of the switch S2 are closed when the roll 60 is raised 3½ sixty-fourths of an inch, i. e., the equivalent of 7/64 of an inch (or 7 ounces) if the skin were measured folded double. Adjustment is made so that the contacts of switches S3 through S8 close at increasing increments corresponding to the above classification.

Figure 7:
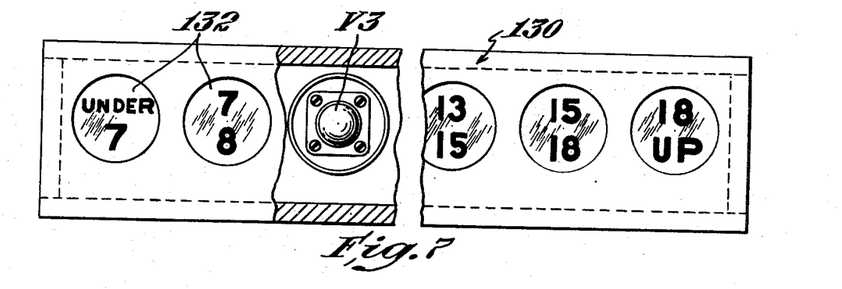
Fig. 7 is a front view with the front wall partially broken away of the indicator panel.

The measurements as determined by the closing of the control switches S2 through S8 are transmitted by means of an electrical circuit, described in detail below, to the signalling devices such as the electrical lamps V1 through V8 which are mounted on an indicator panel 130 (Fig. 7) behind windows 132 bearing appropriate indicia to indicate the measurement in ounces. The indicator panel 130 is preferably mounted, as is shown in Fig. 3, on the cross-head of the area measuring machine M immediately below its indicator G so that both the area and thickness of the skin can be readily determined.

Figure 8:
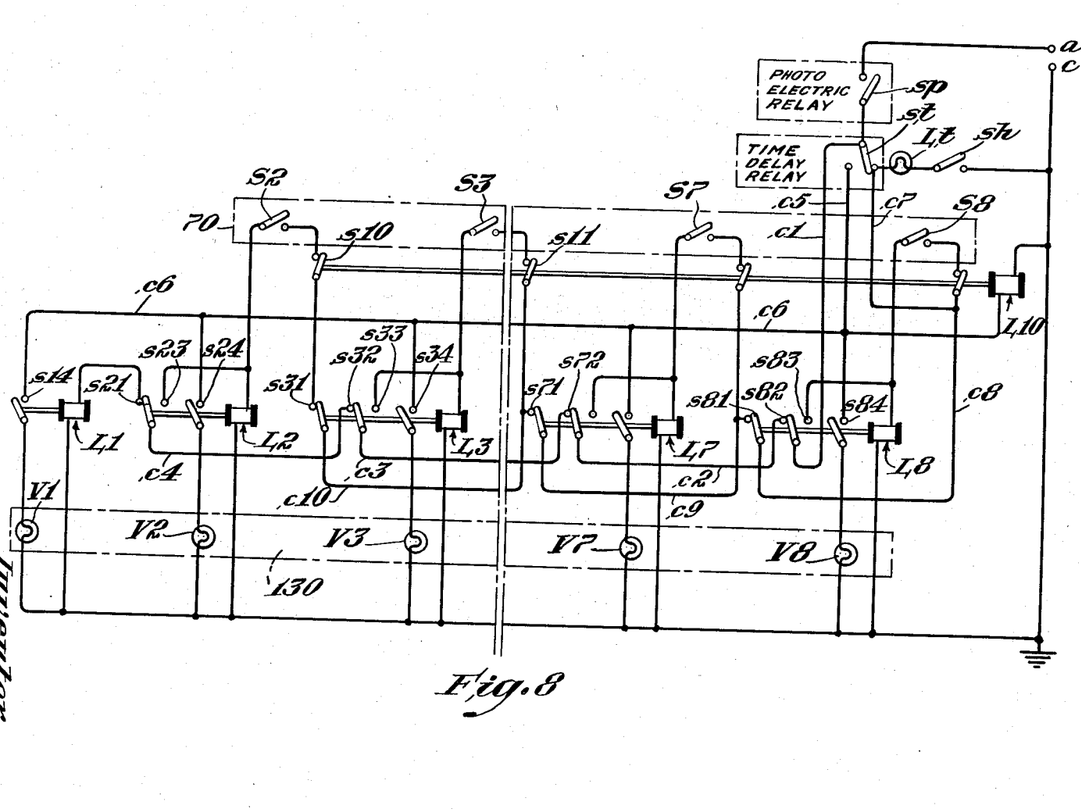
Fig. 8 is a wiring diagram of the electrical circuit.

The operation of the above-mentioned electrical circuit can best be understood with reference to the wiring diagram shown in Fig. 8. In this diagram three relays, which would analogously be designated L4, L5 and L6, have been omitted by providing a break in the diagram between relays L3 and L7 to simplify both the description and diagram. However, it will be apparent from the following description that any number of relays and lamps, giving any desired number of measuring steps, can be used, each relay being connected to the adjacent relays in the same manner in which relay L7 is indicated to be connected to relay L3.

As a skin is fed between the measuring roll 60 and the rollers 56 by the belts 22, and thence proceeds to the point where as it intercepts one or the other of the light beam B portions controlling the photoelectric cell, as described heretofore, the conventional relay, associated with the contacts *sp*, is energized from power source terminals *a* and *c* to close the contacts. The closing of the contacts *sp* completes a circuit including the terminal *a*, the conductor *c1*, the normally closed contacts *s82* of the relay L8, the conductor *c2*, the normally closed contacts *s72* of the relay L7, and in a similar manner the conductors *c3* and *c4* and normally closed contacts of the remaining relays and the solenoid of the relay L1 to the grounded power source terminal *c*. If the thickness of the skin passing through the measuring roll 60 does not raise the roll sufficiently to close the contacts of any of the control switches S2 through S8, by the end of the timing period of the time delay relay, which is adjusted to permit a selected travel of the skin along the conveyor when the contacts *st* transfer, a circuit is completed including the terminal *a*, the photoelectric relay contacts sp, the time delay relay contacts st, a conductor c5, a conductor c6, the normally open contacts S14 of the relay L1 which remains energized through the circuit described above, a signalling device such as the lamp V1 to the grounded terminal c thereby to illuminate the lamp V1. The lamp V1 remains illuminated for the time interval required for the skin to pass along the conveyor belts 22 to a point where it no longer interrupts the light beam B, thereby allowing the contacts of the photoelectric relay st to open. As mentioned above, the glass in front of the lamp V1 bears a suitable legend to indicate that the skin is beneath the lower preset limit of thickness.

If the thickness of the skin is such that only the switch S2 is closed by the movement of the roll 60, the solenoid of the relay L2 is energized by a circuit including the terminal a, the photoelectric contacts sp, the time delay relay contacts st, conductors c7 and c8, the normally closed contacts s81 of the relay L8, the conductor c9, the normally closed contacts s71 of the relay L7, the conductor c10, the normally closed contacts s31 of the relay L3, the normally closed contacts s10 of a relay L10, the contacts of the control switch S2 and the solenoid of the relay L2 to the terminal c. The energizing of the solenoid of the relay L2 transfers its contacts so that a holding circuit is completed through the normally open relay contacts S23 so that the solenoid remains energized if the switch S2 is opened by the subsequent lowering of the roll. This holding circuit for the relay L2 comprises the conductor c1, the normally closed contacts s82, the conductor c2, the normally closed contacts s72, the conductor c3, the normally closed contacts s32, the conductor c4, and the normally open relay contacts s23. When the time delay relay contacts st transfer at the end of the timing period, the lamp V2, behind the window marked 7-8, is illuminated by a circuit including the terminal a, the photoelectric relay contacts sp, the time delay contacts st, the conductors c5 and c6, the normally open contacts s24 of the energized relay L2, and the lamp V2 to the terminal c. It will be noted that only the lamp V2 is illuminated, the circuit to lamp V1 being interrupted by the opening of the contacts S14 of the relay L1 when this relay is deenergized by the opening of the contacts s21 as the relay L2 is energized, as described heretofore.

If the skin is of sufficient thickness to close the contacts of the switch s3, the solenoid of the relay L3 is energized by a circuit including the terminal a, the photoelectric cell relay contacts sp, the time delay relay contacts st, the conductors c7 and c8, the contacts s81, the conductor c9, the contacts s71, the contacts 111, the switch 13 of the relay L10, and the solenoid of the relay L3 to the terminal c. It will be noted that the energization of the relay L3 opens the contacts s31 so that no circuit is completed through the switch S2 to energize the relay L2. The opening of the contacts s32 also precludes the energization of the relay L2 through its holding circuit. After the transfer of the time delay relay contacts st, the lamp V3 is illuminated by means of a circuit analogous to that described in detail heretofore in connection with the lamp V2.

The remaining control switches S7 and S8 (and those not shown) are energized in a similar manner. The normally closed contacts of the relay L10 are provided in the circuits of the control switches S2 through S8 to prevent feedbacks through "sneak" circuits if several of the control switches should be closed simultaneously due to thicker sheet material in the area which is not selected for measuring. By energizing the solenoid of the relay L10 upon the transferring of the time delay relay contacts st, the circuits to the control switches are opened during the portion of the measuring cycle when the lamps V are illuminated. A test lamp Lt is provided which is energized through a switch sh when the time delay relay contacts st are in their normal position. The circuit for this lamp Lt is interrupted by the transfer of the time delay relay contacts st, thereby providing a check upon the position of the skin as the relay contacts transfer.

It should be understood that the present disclosure is for the purpose of illustration only and that this invention includes all modifications and equivalents which fall within the scope of the appended claims.

I claim:
1. Apparatus for determining the thickness of sheet material comprising a conveyor for moving the outstretched material along a substantially horizontal path, a roll pivotally mounted to contact the upper surface of the material as the material is moved along the path by the conveyor so that the angular movement of the roll about the pivot is a measure of the thickness of the material, and circuit means having an indicator operated in response to the angular movement of the roll to indicate the thickness determined by said roll, said circuit means including a detector for energizing said circuit means in response to the presence of the sheet material at a predetermined position in said path and a timer whose timing period is initiated by said detector for interrupting the circuit means at the end of the timing period to limit the distance along which the thickness determination takes place.

2. Apparatus according to claim 1 wherein the timer is connected to energize said indicator at the end of its timing period.

3. Apparatus for determining the thickness of sheet material comprising a plurality of wires arranged as spaced loops corresponding portions of which lie in a substantially horizontal plane, driving means for conjointly moving said wires to form a conveyor for moving the outstretched material along a substantially horizontal path, a roll pivotally mounted to contact the upper surface of the material as the material is moved along the path by the conveyor so that the angular movement of the roll about the pivot is a measure of the thickness of the material, and circuit means having an indicator operated in response to the angular movement of the roll to indicate the thickness determined by said roll, said circuit means including a detector for energizing said circuit means in response to the presence of the sheet material at a predetermined position in said path and a timer whose timing period is initiated by said detector for interrupting the circuit means at the end of the timing period to limit the distance along which the thickness determination takes place.

4. Apparatus for determining the thickness of sheet material comprising a plurality of wires arranged as spaced loops corresponding portions of which lie in a substantially horizontal plane, driving means for conjointly moving said wires to form conveying means for moving the outstretched material along a substantially horizontal path, a plurality of backing rollers mounted below the horizontal plane of wires in spaced relationship so that the respective wires are interposed between adjacent rollers, a measuring roll pivotally mounted to contact the upper surface of the material opposite the backing rollers as the material is moved along the path by the conveyor so that the angular movement of the roll about the pivot is a measure of the thickness of the material, and circuit means having an indicator operated in response to the angular movement of the roll to indicate the thickness determined by said roll, said circuit means including a detector for energizing said circuit means in response to the presence of the sheet material at a predetermined position in said path and a timer whose timing period is initiated by said detector for interrupting the circuit means at the end of the timing period to limit the distance along which the thickness determination takes place.

5. Apparatus according to claim 4 wherein the driving means for the conveying means conjointly operates the rollers and roll so that the peripheral speed thereof is the same as the linear speed of the wires.

6. Apparatus for determining the thickness of sheet material comprising conveying means for moving the material along a predetermined path, a roll pivotally mounted to contact the outer surface of the material as the material moves along the path so that angular movement of the roll about the pivot is a measure of the thickness of the material, circuit means including a plurality of switches and a plurality of signalling devices each of which is energized by the operation of a respective switch, and a mechanical linkage interconnecting said roll and said switches, said linkage including a rotatable shaft having a plurality of contact arms freely supported upon the shaft, a spring for biasing each arm to actuate a respective switch thereby to transfer its contacts, a plurality of lift arms fixed to the shaft with an angular relationship sequentially to move the respective contact arms thus successively returning the contacts of the switches to their normal positions as the shaft is rotated and a movable link for transmitting the angular movement of said roll to said shaft whereby the signalling device correlated with the last returned switch gives an indication of the thickness determined by said roll.

7. Apparatus for determining the thickness of sheet material comprising conveying means for moving the material along a predetermined path, a roll pivotally mounted to contact the outer surface of the material as the material moves along the path so that angular movement of the roll about the pivot is a measure of the thickness of the material, circuit means for indicating the maximum thickness measured by said roll, said circuit means including a plurality of switches, a plurality of relays each having a plurality of pairs of contacts which are transferred by the operation of a respective switch, and a plurality of signalling devices each of which is energized by one pair of contacts of a respective relay, and a mechanical linkage interconnecting said roll and said switches, said linkage including a rotatable shaft having a plurality of contact arms freely supported upon the shaft, a spring for biasing each arm to actuate a respective switch thereby to transfer its contacts, a plurality of lift arms fixed to the shaft with an angular relationship sequentially to move the respective contact arms thus successively returning the contacts of the switches to their normal positions as the shaft is rotated and a movable link for transmitting the angular movement of said roll to said shaft whereby the switches are sequentially operated in response to variations in the angular position of said roll, the remaining relay contacts being interconnected so that only the signalling device corresponding to the maximum thickness of the material is energized.

8. Apparatus for determining the thickness of selected portions of respective pieces of sheet material comprising conveying means for successively moving the pieces along a predetermined path, a roll pivotally mounted to contact the outer surface of each piece as the piece moves past a selected point in the path so that the angular movement of the roll about the pivot is a measure of the thickness of the piece, circuit means including a plurality of switches, a plurality of relays each of which is energized by the operation of a respective switch, each relay having a plurality of pairs of contacts which are transferred by the energization thereof and a plurality of signalling devices each of which is energized by the transfer of one pair of contacts of a respective relay, a linkage interconnecting said roll and said switches sequentially to actuate the switches in response to the angular movement of the roll due to variations in thickness, said circuit means also including a holding circuit for each relay having a pair of normally open contacts operated by such relay and a pair of normally closed contacts operated respectively by each of the relays energized by switches operated sequentially to such relay so that only the signalling device corresponding to the greatest thickness determination is energized at the completion of the thickness determination.

9. Apparatus for determining the thickness of sheet material comprising conveying means for moving the material along a predetermined path, a roll pivotally mounted to contact the outer surface of the materials as the material moves along the path so that angular movement of the roll about the pivot is a measure of the thickness of the material, and circuit means for indicating the maximum thickness measured by said roll, said circuit means including a plurality of switches successively operated by the angular movement of the roll as the distance between the path and the roll is increased, a plurality of relays each including two normally closed contacts, two normally open contacts and a solenoid energized by the operation of a correlated switch to transfer the associated contacts, an energizing circuit for each relay including in series connection the switch correlated with such relay and one pair of normally closed contacts of each of the relays energized by switches which are closed subsequent to the switch correlated with such relay, a holding circuit being completed upon the operation of any of the relays to parallel the correlated switch, said holding circuit including a pair of normally open contacts of such relay and the second pair of normally closed contacts of each of the relays energized by subsequently operated switches whereby only the relay solenoid associated with the switch transferred by the maximum angular movement of the roll remains energized, and a plurality of signalling devices each energized by the transfer of the second pair of normally open contacts of a respective relay so that only the device corresponding to the maximum thickness gives an indication at the completion of the thickness determination.

10. Apparatus for determining the thickness of selected portions of respective pieces of sheet material comprising conveying means for successively moving the pieces along a predetermined path, a roll pivotally mounted to contact the outer surface of each piece as the piece moves past a selected point in the path so that the angular movement of the roll about the pivot is a measure of the thickness of the piece, and circuit means including a plurality of signalling devices for indicating in steps the maximum thickness measured by said roll, said circuit means including photoelectric means for determining the presence of a piece upon the conveying means and thereupon energizing the circuit means, said circuit means also including a plurality of switches and a plurality of relays each of which includes two normally closed contacts, two normally open contacts and a solenoid energized by the operation of a correlated switch to transfer the associated contacts, a linkage interconnecting said roll and said switches sequentially to actuate the switches in response to angular movement of the roll due to variations in thickness, an energizing circuit for each relay including in series connection with the switch correlated with such relay and one pair of normally closed contacts of each of the relays energized by switches which are closed subsequent to the switch correlated with such relay, a respective holding circuit being completed upon the operation of any of the relays to parallel the correlated switch, said holding circuit including a pair of normally open contacts of such relay and the second pair of normally closed contacts of each of the relays energized by subsequently operated switches whereby only the relay solenoid associated with the switch transferred by the maximum angular movement of the roll remains energized, the second pair of normally open contacts of each relay being transferred to energize a respective signalling device so that only the device corresponding to the maximum thickness gives an indication at the completion of the thickness determination.

References Cited in the file of this patent

UNITED STATES PATENTS

| Number | Name | Date |
|---|---|---|
| 811,331 | Rudolf | Jan. 30, 1906 |
| 1,937,815 | Denne et al. | Dec. 5, 1933 |
| 2,018,399 | Engst et al. | Oct. 22, 1935 |
| 2,021,218 | Ballard | Nov. 19, 1935 |
| 2,075,250 | Winkley | Mar. 30, 1937 |
| 2,146,277 | Wilson | Feb. 7, 1939 |
| 2,319,833 | Troy | May 25, 1943 |
| 2,325,011 | Metcalf | July 20, 1943 |
| 2,360,545 | Bond et al. | Oct. 17, 1944 |
| 2,399,305 | Agnew et al. | Apr. 30, 1946 |